United States Patent
Kikuchi

(10) Patent No.: US 6,204,755 B1
(45) Date of Patent: Mar. 20, 2001

(54) OBJECT DETECTING DEVICE

(75) Inventor: Hayato Kikuchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/368,898

(22) Filed: Aug. 6, 1999

(30) Foreign Application Priority Data

Aug. 7, 1998 (JP) .................................................. 10-224309

(51) Int. Cl.$^7$ ...................................................... B60Q 1/00
(52) U.S. Cl. .......................... 340/435; 340/904; 180/169; 250/559.36; 250/559.38; 250/221; 356/4; 342/70; 342/52; 342/107; 342/146; 377/6
(58) Field of Search .................................... 340/435, 436, 340/901, 904, 903; 180/167, 169; 250/221, 559.36, 559.38; 356/4; 342/107, 70, 146, 52; 377/6

(56) References Cited

U.S. PATENT DOCUMENTS

| | | | |
|---|---|---|---|
| 4,303,851 | * 12/1981 | Mottier | 377/6 |
| 5,784,023 | * 7/1998 | Bluege | 342/104 |
| 5,940,011 | * 8/1999 | Agravante et al. | 340/903 |
| 5,955,967 | * 9/1999 | Yamada | 340/904 |
| 5,959,571 | * 9/1999 | Aoyagi et al. | 342/70 |
| 6,121,598 | * 9/2000 | Green et al. | 250/206.1 |

* cited by examiner

Primary Examiner—Benjamin C. Lee
(74) Attorney, Agent, or Firm—Arent Fox Kintner Plotkin & Kahn, PLLC

(57) ABSTRACT

When a vehicle traveling ahead of another vehicle and a reflector on a road exist laterally adjacent each other, signals indicative of reception levels of waves reflected from the objects are added together for every beam to carry out the detection of the target. The preceding vehicle and the reflector are detected in an integrally merged form because the wave reflected from the reflector is strong. Therefore, in a region influenced by the wave reflected from the reflector, only the reflector is detected without addition of the signals indicative of reception levels of the reflected waves for every beam. In a region which is not influenced by the wave reflected from the reflector, the preceding vehicle is detected by adding the signals of the reflected waves together. Thus, the reflector and the preceding vehicle can be detected in a discriminating manner.

12 Claims, 16 Drawing Sheets

FIG.3
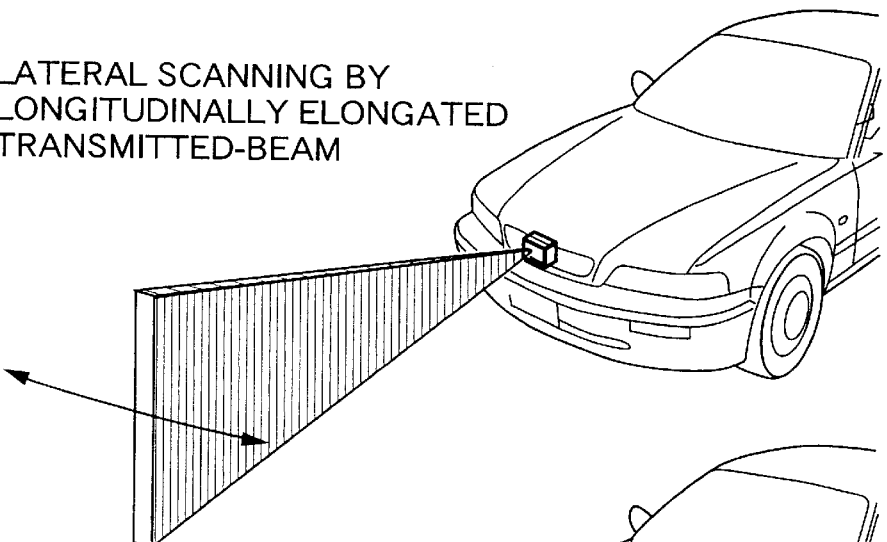
LATERAL SCANNING BY LONGITUDINALLY ELONGATED TRANSMITTED-BEAM
+
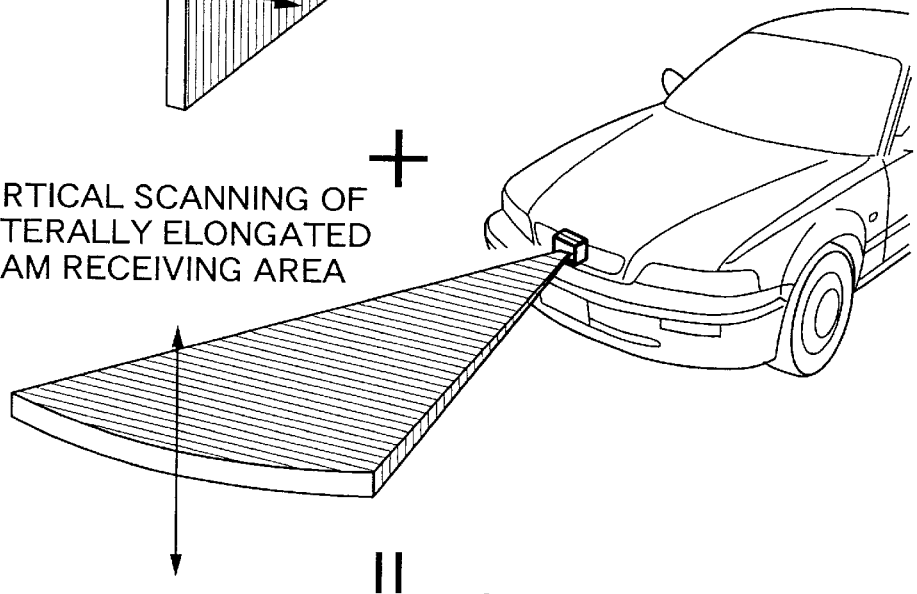
VERTICAL SCANNING OF LATERALLY ELONGATED BEAM RECEIVING AREA
=
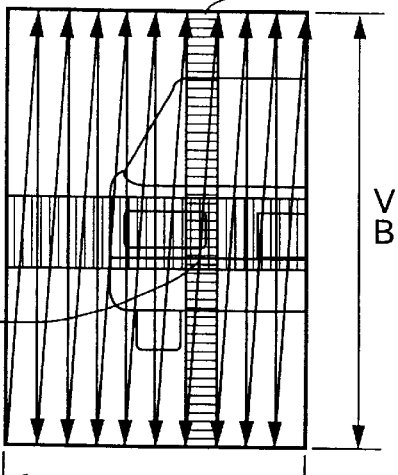
ONE BASIC AREA
VERTICAL SCANNING OF BEAM RECEIVING AREA
SMALL AREA
LATERAL SCANNING BY TRANSMITTED-BEAM

VERTICAL AND LATERAL SCANNING
BY TRANSMITTED-BEAM

OBJECT DETECTING DEVICE

BACKGROUND OF THE INVENTION

1. Field of the Invention

The present invention relates to an object detecting device for detecting an object by transmitting an electromagnetic wave comprising a laser or a millimeter wave to the object and receiving a reflected wave thereof.

2. Description of the Related Art

There is an object detecting device already proposed by the present assignee (see Japanese Patent Application No. 10-200035), which is designed to detect distances to targets $T_1$, $T_2$ - - - and their lateral positions (vehicles traveling ahead of a vehicle) by vertically and laterally scanning with an electromagnetic wave transmitted forwards from a radar system mounted at a front portion of a vehicle V, and receiving a wave reflected by the targets $T_1$, $T_2$ - - -, which device is included in the arrangement of FIG. 6 showing an embodiment of the invention. In this object detecting device, the space for carrying out the detection of the targets $T_1$, $T_2$ - - - is divided into a plurality of detection areas K1 to K15 having a width substantially equal to the lateral width of the vehicle V. Each of the detection areas K1 to K15 is divided into measure-shaped regions depending on the distance from the vehicle V by distance addresses [1] to [200], so that the distances to the targets $T_1$, $T_2$ - - - and their lateral positions are detected based on a value resulting from the addition of signals indicative of reception levels of reflected waves in the measure-shaped regions.

In the above object detecting device, when reflectors $R_2$, $R_2$ are not mounted on rear surfaces of the targets $T_1$, $T_2$ - - -, the detected lateral widths of the targets $T_1$, $T_2$ - - - are equal to the actual lateral widths of the targets $T_1$, $T_2$ - - - . However, when highly reflective reflectors $R_2$, $R_2$ are mounted on the rear surfaces of the targets $T_1$, $T_2$ - - -, signals indicative of reception levels of the reflected waves in a region in which the reflectors $R_2$, $R_2$ are included, are increased, and also signals indicative of reception levels of the reflected waves in a region around the reflectors $R_2$, $R_2$ are increased. Therefore, there is a possibility that the lateral widths of the targets $T_1$, $T_2$ - - - may be detected as values larger than the actual lateral widths of the targets $T_1$, $T_2$ - - - .

When a plurality of targets $T_1$, $T_2$ - - - having highly reflective reflectors $R_2$, $R_2$ exist laterally adjacent one another at the same distance, or when highly reflective reflectors $R_1$ are mounted on a road and the reflectors $R_1$ and targets $T_1$, $T_2$ - - - exist laterally adjacent one another at the same distance, there is a possibility that the targets $T_1$, $T_2$ - - - may be merged together, or the targets $T_1$, $T_2$ - - - and the reflectors $R_1$ on the road may be merged with each other, so that they may be detected as one target $T_1$, $T_2$ having a large lateral width.

SUMMARY OF THE INVENTION

Accordingly, it is an object of the present invention to provide an object detecting device, wherein a plurality of objects existing laterally adjacent one another at the same distance can be prevented from being misdetected as a single object having a large lateral width in a merged manner.

To achieve the above object, according to a first aspect and feature of the present invention, there is provided an object detecting device for detecting an object in an object detecting area by transmitting an electromagnetic wave and receiving a reflected wave resulting from the reflection of the electromagnetic wave by the object, comprising a transmitting and receiving means for transmitting the electromagnetic wave and receiving the reflected wave in each of a plurality of small areas into which the object detecting area has been divided, a first storing means for storing the signals indicative of reception levels of the reflected waves from the small areas in accordance with the time lag from the transmission to the reception of the waves, a second storing means for storing signals indicative of reception levels of reflected waves in a plurality of detection areas in the form of the signals indicative of reception levels added together in accordance with the time lag from the transmission to the reception of the waves, the detection areas being defined by grouping adjacent ones of the plurality of small areas so as to have a predetermined lateral width, and an object detecting means for detecting a distance to the object, based on the result of comparison of an output from the first storing means with an output from the second storing means.

With the above arrangement, the output from the first storing means for storing the signals indicative of reception levels in the small areas without addition of them to provide a distance to an object which is easy to reflect the electromagnetic wave, is compared with the output from the second storing means for storing the signals indicative of reception levels in the small areas in the form of these signals added together in the detection area units to provide a distance to an object which is hard to reflect the electromagnetic wave, whereby the distance to the object is detected on the basis of the result of the comparison. Therefore, when a plurality of objects may be misdetected as a single object as a result of being merged together due to the output from the second storing means, the misdetection can be prevented by making up for the merging by the output from the first storing means, whereby the plurality of objects can be reliably detected in a discriminated manner.

The predetermined lateral width is set at 1.6 m in the disclosed embodiments, but such value is a matter for design, which can be changed properly depending on the size of an object to be detected. In a first embodiment, a beam transmitting section 1, a transmitted-beam scanning section 2, a beam receiving section 3 and a received-beam scanning section 4 form a transmitting and receiving means, and in a third embodiment, the beam transmitting section 1, the transmitted-beam scanning section 2, the beam receiving section 3 and a transmitted and received-beam scanning section 4' form a transmitting and receiving means.

According to a second aspect and feature of the present invention, the second storing means detects a lateral position of the object based on a lateral position of the detection area where the object has been detected.

With the above arrangement, the lateral position of each of the detection areas is previously determined in accordance with the collection of the small areas and hence, the lateral position of the object can be detected based on the lateral position of the detection area where the object has been detected.

According to a third aspect and feature of the present invention, the plurality of detection areas are defined in an overlapped pattern one on another by one half of the lateral width thereof.

With the above arrangement, since detection areas are defined in an overlapped pattern one on another by one half of the lateral width, even when an object exists in any lateral position, the object can be reliably detected in a cover-up manner in any detection area.

According to a fourth aspect and feature of the present invention, the second storing means extracts and outputs values exceeding a threshold value resulting from the addition of a plurality of signals indicative of reception levels in accordance with the time lag from the transmission to the reception of the electromagnetic wave.

With the above arrangement, since one of values resulting from the addition of a plurality of received signals in accordance with the time lag from the transmission to the reception of the electromagnetic wave, which exceeds a threshold value, is extracted, only an object providing a sufficiently large signal indicative of reception level of the reflected wave can be reliably detected in an extracted manner.

According to a fifth aspect and feature of the present invention, the transmitting and receiving means transmits the electromagnetic wave sequentially laterally, and the first storing means serves for detecting the lateral position of the object based on the timing of transmitting the electromagnetic wave to each of the small areas.

With the above arrangement, since the transmitting and receiving means transmits the electromagnetic wave sequentially laterally, the lateral position of the object detected by the electromagnetic wave can be detected based on the timing of transmission of the electromagnetic wave by the transmitting and receiving means.

According to a sixth aspect and feature of the present invention, the object detecting device is mounted on a vehicle to detect the object existing ahead of the vehicle in the direction of movement of the vehicle, and the lateral width of the detection area is set based on the lateral width of the vehicle or the width of a lane of the road.

With the above arrangement, since the lateral width of the detection area is set based on the lateral width of the vehicle or the width of the lane, a detection area having an appropriate size depending on the size of a vehicle traveling ahead of the vehicle (which will be referred to as a preceding vehicle hereinafter) can be set, thereby reliably detecting the preceding vehicle.

According to a seventh aspect and feature of the present invention, the lateral width of the detection area is set to be substantially equal to the lateral width of the vehicle or the width of a lane.

With the above arrangement, since the lateral width of the detection area is set to be substantially equal to the lateral width of the vehicle or the width of the lane, the entire preceding vehicle can be reliably detected in a cover-up manner in the detection area.

According to an eighth aspect and feature of the present invention, the object detecting means detects the distance to and the lateral position of the object, based on (1) data remaining after deletion of the data for the distances to and the lateral positions of the object based on the data stored in the first storing means from the data for the distances to and the lateral positions of the object based on the data stored in the second storing means, and (2) the data stored in the first storing means.

With the above arrangement, in a section where the data for the distances to and the lateral positions of the object based on the data stored in the first storing means and the data for the distances to and the lateral positions of the object based on the data stored in the second storing means are overlapped with each other, the data from the second storing means is deleted, and the data from the first storing means is used. Therefore, when a plurality of objects may be misdetected as a single object as a result of being merged, based on the data from the second storing means, which has been stored as data resulting from the addition of the signals indicative of reception levels, the misdetection can be prevented to reliably detect the plurality of objects in a discriminated manner by preferentially using the data from the first storing means, which stores the signals indicative of reception levels without addition of the signals.

According to a ninth aspect and feature of the present invention, the object detecting device includes a third storing means for storing data for distances to and lateral positions of the object based on the data stored in the first storing means, and a fourth storing means for storing data for distances to and lateral positions of the object based on the data stored in the second storing means, and the object detecting means detects the distance to and the lateral position of the object, based on (1) data remaining after deletion of the data for the distances to and the lateral positions of the object stored in the third storing means from the data for the distances to and the lateral positions of the object stored in the fourth storing means, and (2) the data stored in the third storing means.

With the above arrangement, in a section where the data for the distances to and the lateral positions of the object stored in the third storing means based on the data stored in the first storing means and the data for the distances to and the lateral positions of the object stored in the fourth storing means based on the data stored in the second storing means are overlapped with each other, the data from the fourth storing means is deleted, and the data from the third storing means is used. Therefore, when a plurality of objects may be misdetected as a single object as a result of being merged, based on the data from the fourth storing means, which has been stored as data resulting from the addition of the received signals, the misdetection can be prevented to reliably detect the plurality of objects in a discriminated manner by preferentially using the data from the third storing means, which stores the signals indicative of reception levels without addition of them.

According to a tenth aspect and feature of the present invention, the object detecting device includes a third storing means for storing data for distances to and lateral positions of the object based on the data stored in the first storing means, and a fourth storing means for storing data for distances to and lateral positions of the object based on the data stored in the second storing means, the second storing means storing data remaining by deleting data corresponding to the data stored in the third storing means from the data stored in the first storing means, and the object detecting means detects distances to and lateral positions of the object based on (1) the data for the distances to and the lateral positions of the object stored in the fourth storing means and (2) the data stored in the third storing means.

With the above arrangement, the data for the distances to and the lateral positions of the object are stored in the third storing means based on the data stored in the first storing means; the data remaining by deleting the data corresponding to the data stored in the third storing means from the data stored in the first storing means is stored in the second storing means; and the data for the distances to and the lateral positions of the object is stored in the fourth storing means based on the data stored in the second storing means. Therefore, it is possible to eliminate a section where the data for the distances to and the lateral positions of the object stored in the third storing means and the data for the distances to and the lateral positions of the object stored in the fourth storing means are overlapped with each other. Thus, a plurality of objects can be prevented from being misdetected as a single object as a result of being merged together by the data from the fourth storing means, which comprises signals indicative of reception levels added together and stored, whereby the plurality of objects can be reliably detected in a discriminated manner.

The above and other objects, features and advantages of the invention will become apparent from the following description of the preferred embodiment taken in conjunction with the accompanying drawings.

BRIEF DESCRIPTION OF THE DRAWINGS

FIGS. 1 to 12 show first and second embodiments of the present invention, wherein FIG. 1 is a block diagram of an object detecting device according to the embodiments of the present invention.

FIG. 2 is a perspective view of the object detecting device

FIG. 3 is an illustration for explaining a scanning method.

FIG. 4 is a diagram for explaining a scanning method.

FIG. 5 is a block diagram of an essential portion of the object detecting device.

FIG. 6 is a diagram for explaining basic areas and detection areas.

FIG. 7 is an enlarged diagram of a portion 7 shown in FIG. 6.

FIG. 8 is a diagram for explaining the operation.

FIG. 9 is a diagram for explaining the operation.

FIG. 10 is a first portion of a flow chart for explaining the operation.

FIG. 11 is a second portion of the flow chart for explaining the operation.

FIG. 12 is a third portion of the flow chart for explaining the operation.

FIGS. 13 to 16 show a third embodiment of the present invention, wherein

FIG. 13 is a block diagram of an object detecting device.

FIG. 14 is a perspective view of the object detecting device.

FIG. 15 is an illustration for explaining a scanning method.

FIG. 16 is a diagram for explaining a scanning method.

DESCRIPTION OF THE PREFERRED EMBODIMENTS

First and second embodiments of the present invention will now be described with reference to FIGS. 1 to 12.

Figure 1:
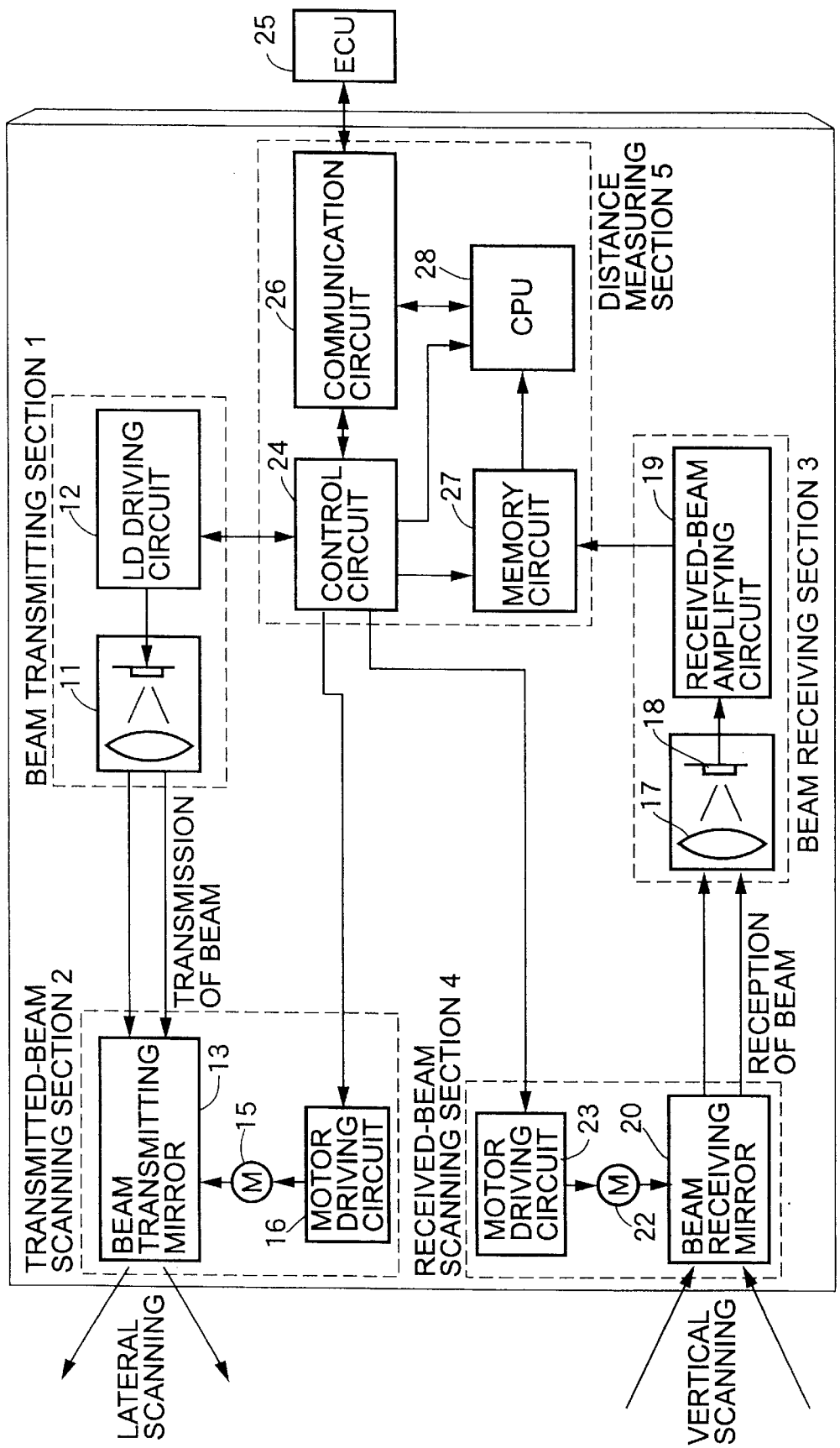
Figure 2:
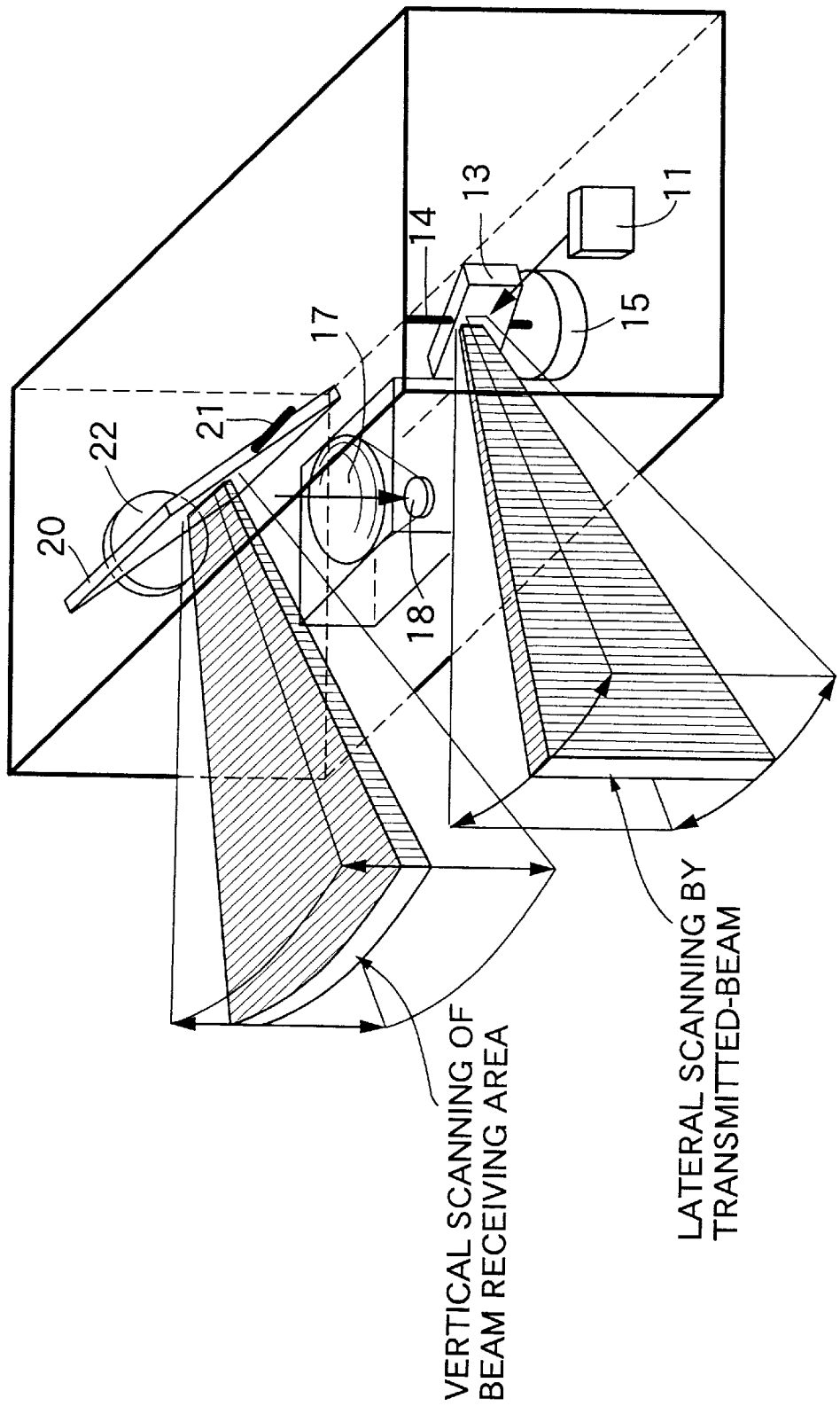

As shown in FIGS. 1 and 2, an object detecting device for detecting the distance between a vehicle V and a target T which is, for example, another vehicle traveling ahead of the vehicle V (which will be referred to as a preceding vehicle) and the direction of the preceding vehicle. The object detecting device comprises a beam transmitting section 1, a transmitted-beam scanning section 2, a beam receiving section 3, a received-beam scanning section 4, and a distance measuring section 5. The beam transmitting section 1 includes a laser diode 11 integrally provided with a beam transmitting lens, and a laser diode driving circuit 12 for driving the laser diode 11. The transmitted-beam scanning section 2 includes a beam transmitting mirror 13 for reflecting the laser output of the laser diode 11, a motor 15 for reciprocally turning the beam transmitting mirror 13 about a vertical axis 14, and a motor driving circuit 16 for controlling the driving of the motor 15. The laser beam output from the beam transmitting mirror 13 has a vertically elongated pattern, as a result of being limited in lateral width. The target T is scanned laterally at a period of 1400 msec by this laser beam.

The beam receiving section 3 includes a beam receiving lens 17, a photo-diode 18 for receiving the reflected beam focused by the beam receiving lens 17 to convert the beam into an electric signal, and a received-beam amplifying circuit 19 for amplifying the signal output from the photo-diode 18. The received-beam scanning section 4 includes a beam receiving mirror 20 for reflecting the wave reflected from the target to introduce it to the photo-diode 18, a motor 22 for reciprocally turning the beam receiving mirror 20 about a lateral axis 21, and a motor driving circuit 23 for controlling the driving of the motor 22. A beam receiving area scanned vertically at a period of 10 msec by the beam receiving mirror 20, has a laterally elongated pattern as a result of being limited in vertical width.

The distance measuring section 5 includes a control circuit 24 for controlling the laser diode driving circuit 12 and the motor driving circuits 16 and 23, a communication circuit 26 for conducting communication between an electronic control unit (ECU) 25 for controlling a cruise control system and an automatic brake device, a memory circuit 27 for storing a signal indicative of reception levels of laser beam, and a central processing unit (CPU) 28 as an object detecting means for calculating the distance from the vehicle to the target T, based on the time from the transmission to the reception of the beam.

Figure 4:
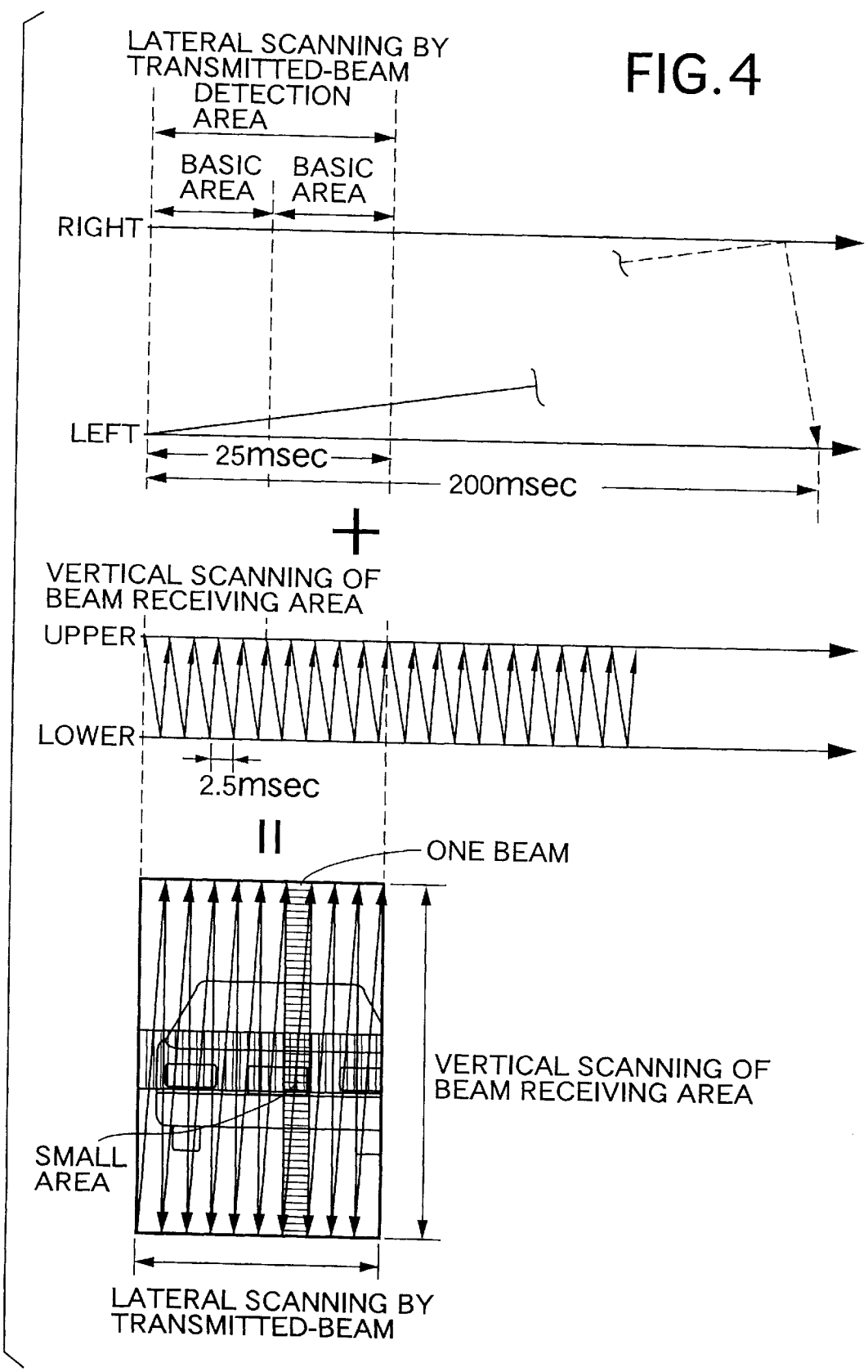

As shown in FIGS. 3 and 4, the target T is scanned laterally in a period of 200 msec by the vertically elongated laser beam from the object detecting device, and the laterally elongated beam receiving area for the object detecting device is scanned vertically in a period of 2.5 msec. A section where the laser beam and the beam receiving area intersect each other is a single small area. The overall area in which the scanning is carried out, comprises a grouping of a total of 400 smaller areas created by longitudinally dividing the entire area into 5 sections and laterally dividing the entire area into 80 sections. The 400 smaller areas are scanned in a zigzag manner for 200 msec.

Figure 6:
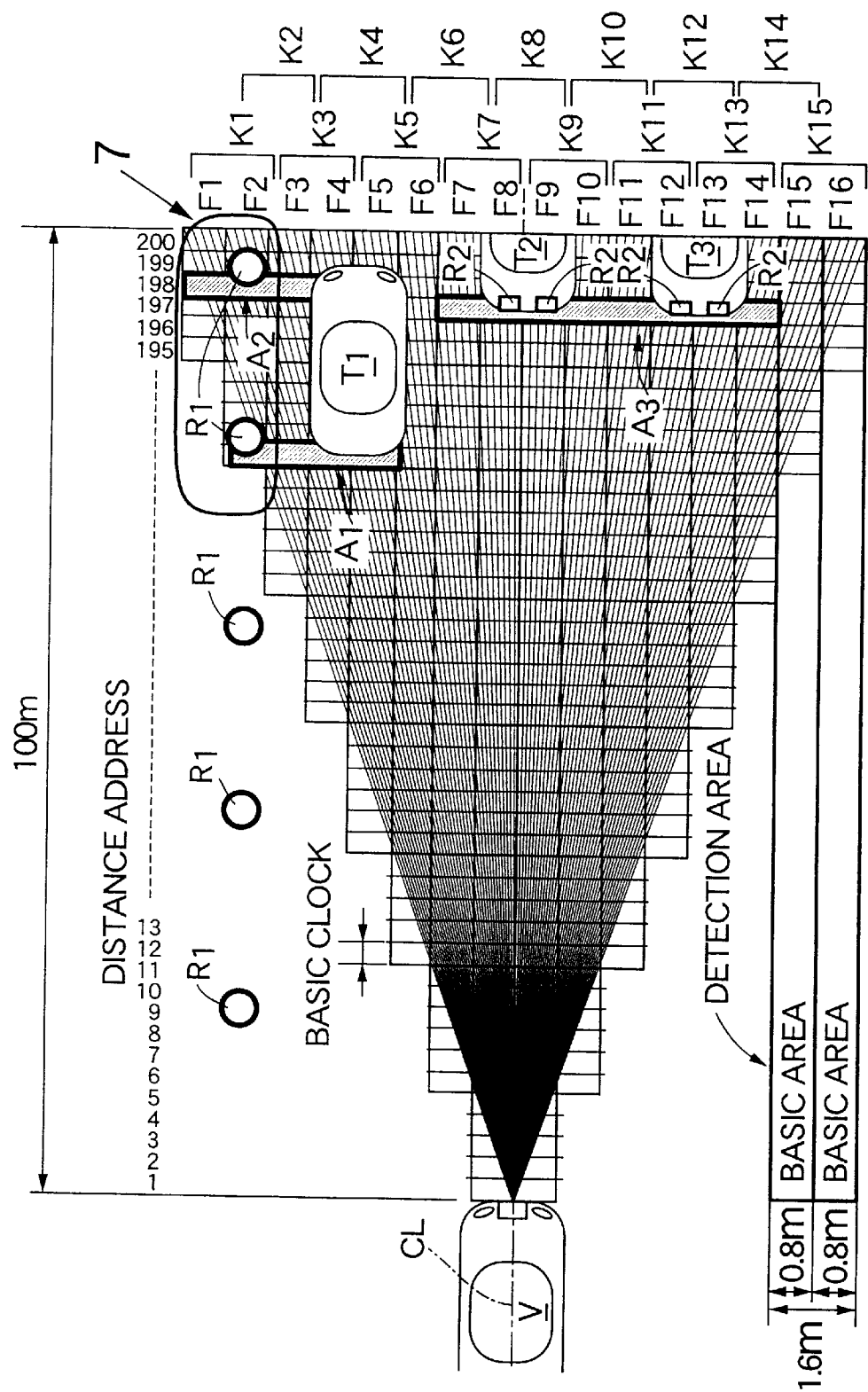

As shown in FIG. 6, the detection of targets $T_1$, $T_2$ and $T_3$ is carried out in a range from the vehicle V to a point 100 m spaced forward from the vehicle V. The range from the vehicle V to a point 100 m spaced forward from the vehicle V is divided into a first basic area F1 to a sixteenth basic area F16 by a plurality of parallel lines drawn in parallel to a vehicle body axis CL of the vehicle V and having a width of 0.8 m. The first basic area F1 to the sixteenth basic area F16 are arranged laterally symmetrically from the left to the right as viewed from the vehicle V. The boundary between the eighth basic area F8 and the ninth basic area F9 coincides with the vehicle body axis CL of the vehicle V.

An area created by the addition of the adjacent first and second basic areas F1 and F2 is defined as a first detection area K1; an area created by addition of the adjacent second and third basic areas F2 and F3 is defined as a second detection area K2; and an area created by addition of the adjacent third and fourth basic areas F3 and F4 is defined as a third detection area K3. By combining the first to sixteenth basic areas F1 to F16 in the above manner, the first to fifteenth detection areas K1 to K15 are defined in a divided manner sequentially from the left to the right in a state in which they are overlapped one on another by 0.8 m. The width of each of the detection areas K1 to K15 is 1.6 m, which is selected as a value approximately equal to the lateral width of a common vehicle V. The width of each of the detection areas K1 to K15 may be increased to slightly more than 1.6 m and set on the order of the lateral width of a common road lane.

Figure 7:
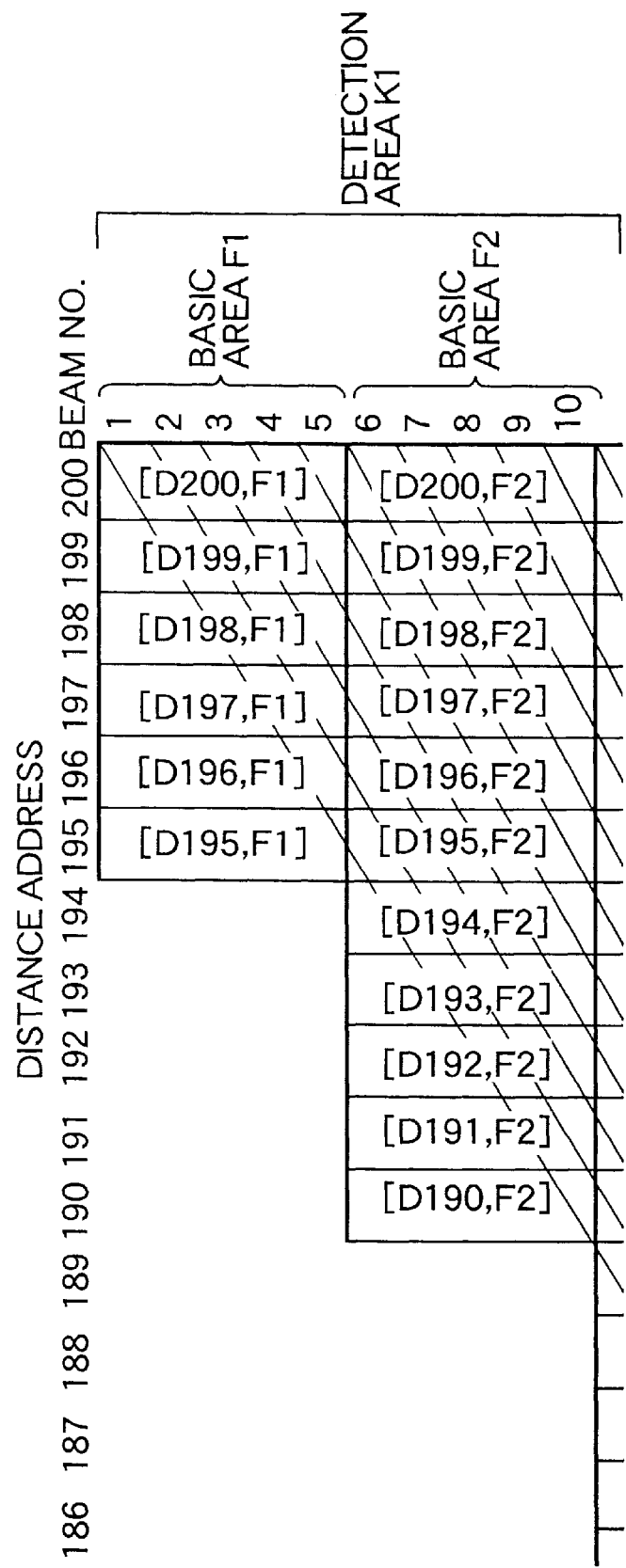

As can be seen by reference to FIG. 6 in combination with FIG. 7, the first to sixteenth basic areas F1 to F16 defined in a band shape having a width of 0.8 m, are subdivided into areas for every 0.5 m depending on the distance from the vehicle V, and a distance address is affixed to each area for every distance of 0.5 m. For example, the distance address [1] corresponds to the distance of 0.5 m; the distance address [2] corresponds to the distance of 1.0 m; the distance address [100] corresponds to the distance of 50.0 m; and the distance address [200] corresponds to the distance of 100.0 m. Therefore, the overall area where the detection of the targets $T_1$, to $T_3$ is carried out (a triangular area in FIG. 6) is divided into fine measure-shaped regions by the basic area Nos. F1 to F16 and the distance addresses [1] to [200].

The laser beam transmitted from the vehicle V is widened radiantly and hence, regions having a possibility that the targets $T_1$, $T_2$ and $T_3$ could be detected in the first basic area F1 lying on the leftmost position as viewed from the vehicle V, are regions corresponding to the distance addresses [195] to [200], and regions having a possibility that the target $T_1$, $T_2$ and $T_3$ could be detected in the second basic area F2 laterally inward adjacent the first basic area, are regions corresponding to the distance addresses [190] to [200]. Therefore, the range of the distance addresses having the possibility of detection of the targets $T_1$ to $T_3$ is increased, as it is closer to the vehicle body axis CL of the vehicle V. In the adjacent eighth and ninth basic areas F8 and F9 on the opposite sides of the vehicle body axis CL of the vehicle V, there is a possibility that the targets $T_1$, $T_2$ and $T_3$ could be detected in all the distance addresses [1] to [200].

In a region of the distance address [200] 100 m spaced apart from the vehicle V, five beams arranged laterally are included in each of the basic areas F1 to F16. The density of the beams included in each of the basic areas F1 to F16 is increased, as the distance address is decreased (closer to the vehicle V). For example, in a region of the distance address [100] 50 m spaced apart from the vehicle V in a certain basic area, the density of the included beams is double, as compared with the density in a region of the distance address [200] 100 m spaced apart from the vehicle V.

Figure 5:
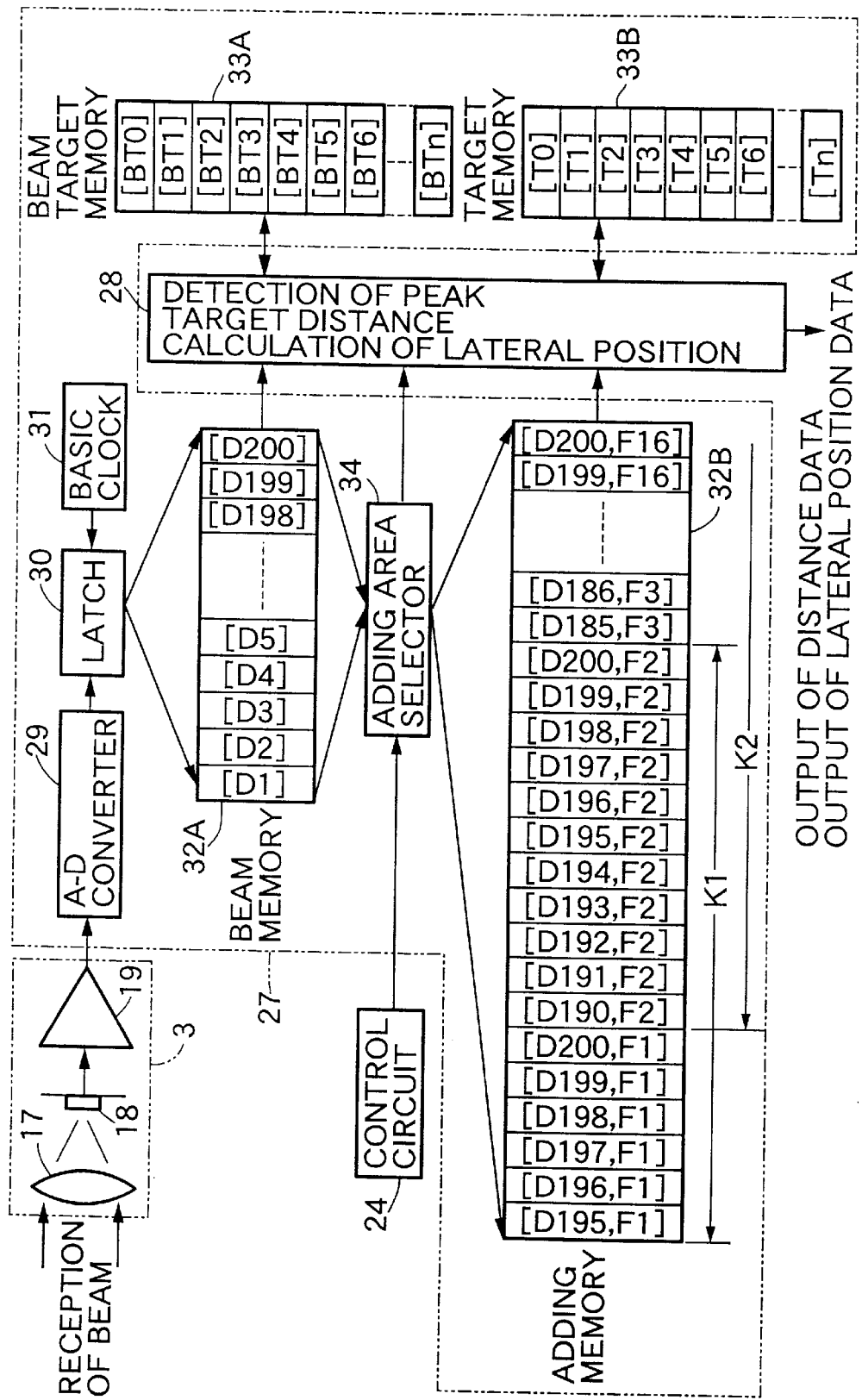

The arrangement of an essential portion of the object detecting device will be described with reference to FIG. 5.

The memory circuit 27 connected to the beam receiving section 3 includes an A-D converter 29 for conducting the A-D conversion of a signal indicative of reception level of a reflected wave received by the beam receiving section 3, a latch circuit 30 for temporarily holding the signal indicative of reception level converted in the A-D manner, and a basic clock circuit 31 for outputting a pulse signal of a given period to the latch circuit 30. A beam memory 32A as a first storing means, is connected to the latch circuit 30 and includes 200 storing regions corresponding to the distance addresses [1] to [200]. Therefore, when the reflected wave produced by the reflection of the laser beam transmitted to each of the smaller areas from the target is received, the signal indicative of reception level is stored in the storing region corresponding to the distance to the target.

An adding memory 32B as a second storing means, is connected to the beam memory 32A through an adding area selector 34 and includes storing regions for storing a large number of data points [D195, F1], [D196, F1], [D197, F1]–[D199, F16] and [D200, F16] recognized by the basic area Nos. F1 to F16 and the distance addresses [1] to [200]. The first half of the data stored in each of the storing regions corresponds to the distance addresses, and the second half corresponds to the basic area Nos. F1 to F16.

As can be seen even from FIG. 7, the first six of the storing regions in the adding memory 32B correspond to 6 measures in the first basic area F1 at a left end, and the next eleven of the storing regions correspond to 11 measures in the second basic area F2. The adding area selector 34 connected to the control circuit 24 stores the A-b converted signal indicative of reception level in any storing region of the adding memory 32B corresponding to the distance to and the direction of the target having reflected the laser beam, which have been determined based on the direction of transmission of the laser beam and the time lag from the transmission to the reception of the laser beam. The distance of 0.5 m which is a recognizing interval for the distance to the target, corresponds to the period of a pulse signal output by the basic clock circuit 31.

The central processing unit 28 of the object detecting device of the present embodiment calculates the distance to and the lateral position of the target based on the data stored in the beam memory 32A, and allows the results of the calculation to be stored in a beam target memory 33A. The beam target memory 33A forming the first storing means or a third storing means of the present embodiment includes storing regions for storing data points [BT0], [BT1] for distances to and lateral positions of a plurality of targets. When a plurality of targets have been detected, distances to and lateral positions of the targets are stored sequentially. Further, the central processing unit 28 calculates distances to and lateral positions of the targets based on the data stored in the adding memory 32B, and allows the results of the calculation to be stored in a target memory 33B. The target memory 33B forming the second storing means or a fourth storing means of the present embodiment includes storing regions for storing data points [T0], [T1] for distances to and lateral positions of a plurality of targets. When a plurality of targets have been detected, distances to and lateral positions of the targets are stored sequentially.

The central processing unit 28 determines which of the data stored in the beam target memory 33A and the data stored in the target memory 33B is used, and deletes the unused data. The function of the central processing unit 28 will be described in detail hereinafter.

A procedure of calculating the distance to and the lateral position of the target based on the signal indicative of reception level stored in the beam memory 32A and storing the results of the calculation in the beam target memory 33A is as follows: The central processing unit 28 reads out those signals of the reflected waves corresponding to the five longitudinally arranged small areas, which have been stored in the beam memory 32A, and extracts data exceeding a threshold value from the read signals. The extracted data is sequentially stored in the storing regions [BT0], [BT1], [BT2], of the beam target memory 33A. In example shown in FIG. 8, distances to and lateral positions of two reflectors $R_1$, $R_1$ on a road and distances to and lateral positions of two reflectors $R_2$, $R_2$ provided at rear portions of vehicle bodies of two targets $T_2$, $T_3$, i.e., a total of four reflectors $R_2$ are sequentially stored in the storing regions [BT0], [BT1], [BT2], of the beam target memory 33A.

The procedure of adding the signals indicative of reception levels in the small areas stored in the beam memory 32A to store the result of the addition in the adding memory 32B by the adding area selector 34 will be described below. The detection of the target is carried out in each of the first to fifteenth detection areas K1 to K15. The detection of the target in the first detection area K1 will be described as one example. The first detection area K1 is defined by joining the first and second basic areas F1 and F2 together, and the adding memory 32B includes storing regions for storing seventeen data points [D195, F1], [D196, F1],–[D199, F2] and [D200, F2]corresponding to the first detection area K1 (see FIG. 5).

FIG. 6 shows a horizontal section of one of the first to fifteenth detection areas K1 to K15. In fact, the small areas included in each of the first to fifteenth detection areas K1 to K15 are vertically overlapped in five layers, and hence, five small areas per beam are included.

As can be seen from FIG. 7, for example, the data point [D200, F1] stored in the storing region of the distance address [200] in the first basic area F1 comprises a value provided by the addition of the signals indicative of reception levels from twenty five small areas corresponding to the beam Nos. 1 to 5. The content of such data is represented by [D200, F1] =Σ(B1:B5)/25. This corresponds to an average value provided by adding the signals indicative of reception levels from the distance of the distance address [200] in the twenty five small areas corresponding to the beam Nos. 1 to 5 and dividing the resulting value by 25.

Likewise, the data point [D199, F1] stored in the storing region of the distance address [199] in the first basic area F1 is provided by adding the signals indicative of reception levels from the twenty small areas corresponding to the beam Nos. 1 to 4. The content of such data is represented by [D199, F1] =Σ(B1:B4)/20. This corresponds to an average value provided by adding the signals indicative of reception levels from the distance of the distance address [199] in the twenty small areas corresponding to the beam Nos. 1 to 4 and dividing the resulting value by 20.

Likewise, the data point [D200, F2] stored in the storing region of the distance address [200] in the second basic area F2 is provided by adding the signals indicative of reception levels from the twenty five small areas corresponding to the beam Nos. 6 to 10. The content of such data is represented by [D200, F2] =Σ(B6:B10)/25. This corresponds to an average value provided by adding the signals indicative of reception levels from the distance of the distance address [200] in the twenty five small areas corresponding to the beam Nos. 6 to 10 and dividing the resulting value by 25.

The central processing unit 28 reads out the data points [D195, F1], [D196, F1], –[D199, F2] and [D200, F2] stored in the seventeen storing regions corresponding to the first and second basic areas F1 and F2, and calculates eleven data points [D190, K1], [D191, K1], [D192, K1] [D199, K1] and [D200, K1] in the first detection area K1 defined by joining the first and second basic areas F1 and F2 based on such data.

As can be seen from FIG. 7, the five data points [D190, K1], [D191, K1]–[D194, K1] in the first detection area K1 closer to the vehicle V are those in a section which does not include the first basic area F1 and includes only the second basic area F2. Therefore, the five data points [D190, K1], [D191, K1]–[D194, K1] are five data points [D190, F2], [D191, F2] [D194, F2] themselves in the second basic area F2.

On the other hand, the six data points [D195, K1], [D196, K1]–[D200, K1] in the first detection area K1 farther from the vehicle V are those in a section including both of the first and second basic areas F1 and F2. Therefore, the six data points [D195, K1], [D196, K1]–[D200, K1] are average values provided by adding six data points [D195, F1], [D196, F1]–[D200, F1] in the first basic area F1 and six data points [D195, F2], [D196, F2]–[D200, F2] in the second basic area F2 and dividing the resulting values by 2, respectively.

For example, the data point [D200, K1] of the distance address [200] in the first detection area K1 is an average value provided by adding the data point [D200, F1] in the first basic area F1 and the data point [D200, F2] in the second basic area F2 and dividing the resulting value by 2 and hence, is represented by [D200, K1]=([D200, F1]+ [D200, F2])/2.

When the calculation of the eleven data points [D190, K1], [D191, K1]–[D200, K1] in the first detection area K1 is completed in the above manner, a peak point is extracted. If the eleven data points are

[D190, K1]=20
[D191, K1]=15
[D192, K1]=42
[D193, K1]=80 (a peak point)
[D194, K1]=60
[D195, K1]=37
[D196, K1]=20
[D197, K1]=30
[D198, K1]=27
[D199, K1]=16 and
[D200, K1]=18, the data point [D193, K1] exceeding a preset threshold value (e.g., 70) is a peak point. Thus, it is detected that a target exists at a point spaced at a distance corresponding to the distance address [193] apart from the vehicle V (96.5 m ahead of the vehicle V) in the direction of the first detection area K1.

Peak points are extracted in all of the detection areas K1 to K15, and distances to and lateral positions of the target corresponding to the peak points are stored in the plurality of storing regions in the target memory 33B.

Each of three regions shown by reference characters $A_1$, $A_2$ and $A_3$ in FIG. 6 is a group of regions corresponding to the peak points extracted from the data stored in the adding memory 32B. The region indicated by reference character $A_1$ is a region where the reflector $R_1$ having a higher reflectivity and mounted on the road and the target $T_1$ are detected in an integrally merged manner, and such region is represented by a group of three data points [D191, K1], [D191, K2] and [D191, K4] astride the three detection areas K1, K2 and K4.

The region indicated by reference character $A_2$ is a region where the reflector $R_1$ having a high reflectivity and mounted on the road is detected, and such region is represented by a group of two data points [D198, K1] and [D198, K2] astride the two detection areas K1 and K2. The region indicated by reference character $A_3$ is a region where the two targets $T_2$ and $T_3$ are detected which have the reflectors $R_2$ of a high reflectivity mounted at rear portions of their vehicle bodies and which are traveling side by side. Such region is represented by a group of six data points [D197, K7], [D197, K8], [D197, K9], [D197, K11], [D197, K12] and [D197, K13] astride the seven detection areas K7 to K13.

If the highly reflective reflectors $R_1$ and $R_2$ are mounted on the road and the targets $T_1$ - - - , the following problem may be encountered: These reflectors $R_1$ and $R_2$ may be misrecognized as a single object due to the integral merging of them. Therefore, according to the present embodiment, it is ensured that discrimination between the reflectors $R_1$ and $R_2$ and the targets $T_1$ can be carried out, and the individual distances to and the individual lateral positions of them can be detected precisely, in the following manner.

Figure 8:
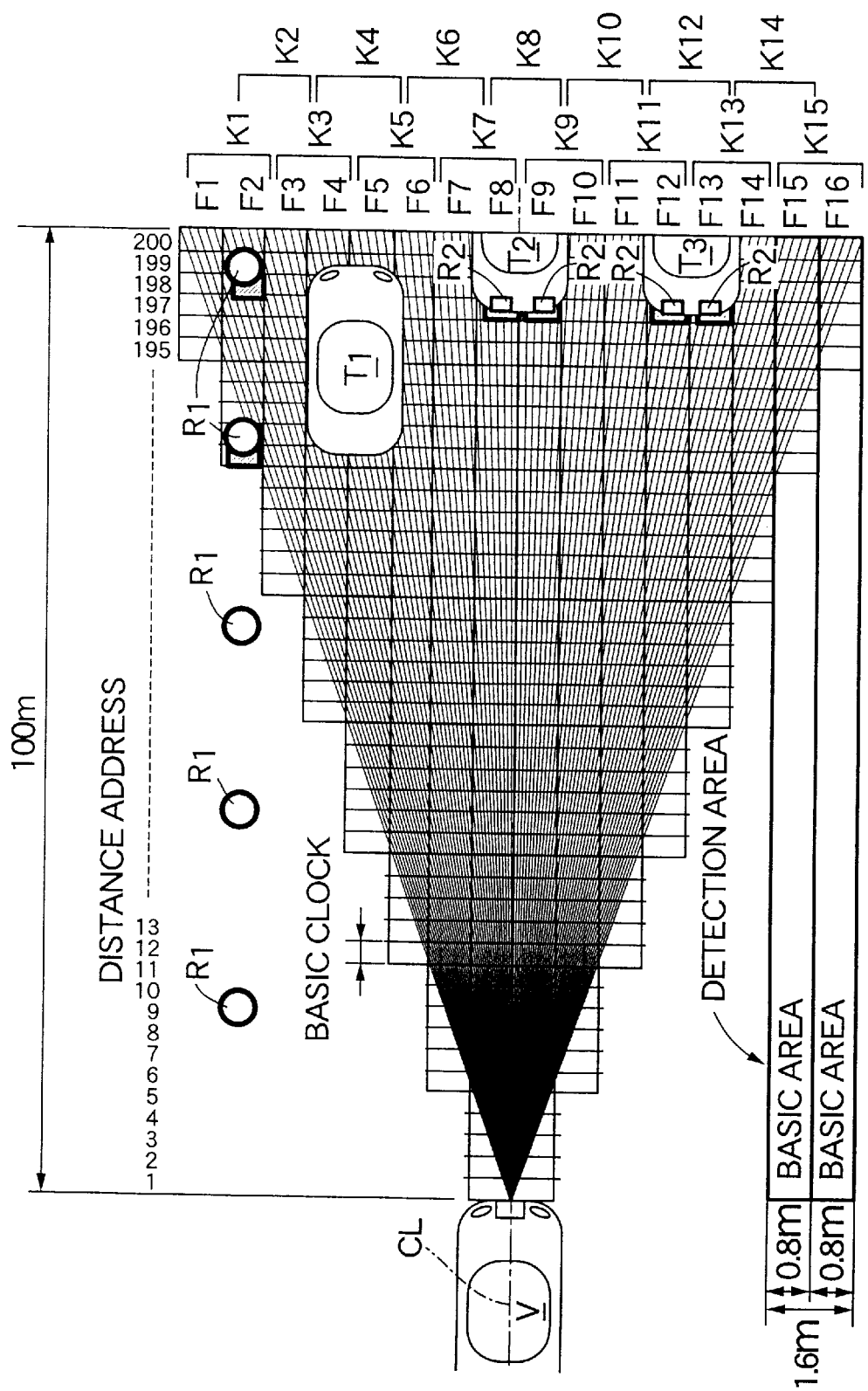

As shown in FIG. 6, in the region indicated by reference character $A_1$, the three data points [D191, K1], [D191, K2] and [D191, K4] have been stored in the target memory 33B, but because the reflector $R_1$ on the road exists in the region indicated by reference character $A_1$, the data corresponding to the reflector $R_1$ has been stored in the beam target memory 33A (see FIG. 8). Therefore, the data is deleted, which has an address coinciding with that of the data for the reflector $R_1$ stored in the beam target memory 33A among the three data points [D191, K1], [D191, K2] and [D191, K4] in the region indicated by reference character A, in FIG. 6. More specifically, the data for the reflector $R_1$, stored in the beam target memory 33A exists in the second basic area F2 and hence, among the three data points [D191, K1], [D191, K2] and [D191, K4] stored in the target memory 33B, the data points [D191, K1] and [D191, K2] including the second basic area F2 are deleted, and only the data point [D191, K4] is left in the target memory 33B. Then, data for the reflector $R_1$ read out of the beam target memory 33A are newly stored in the target memory 33B.

Figure 9:
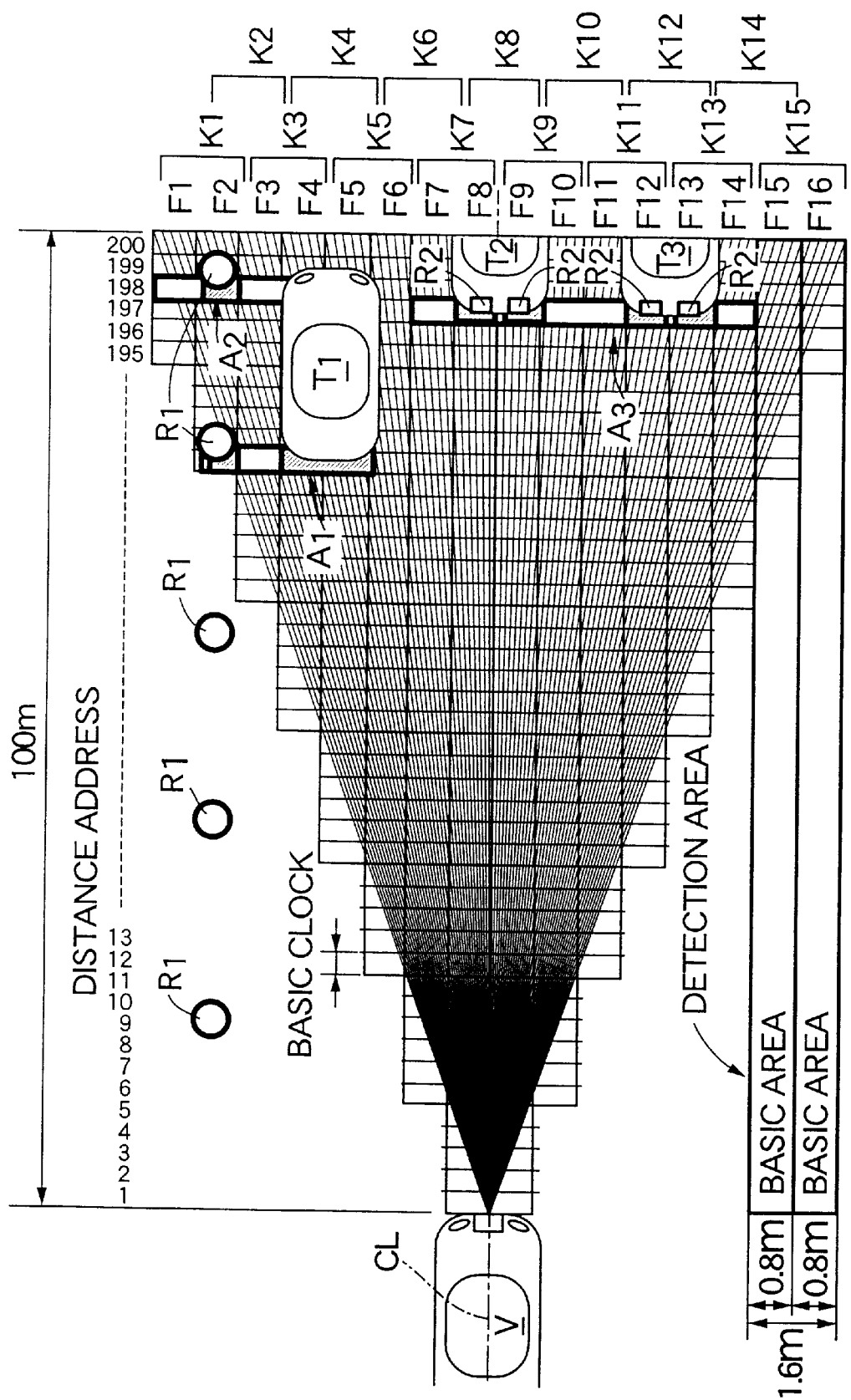

As a result, the data in a whitened portion of the region indicated by the reference character $A_1$ in FIG. 9 is deleted, and the data point [D191, K4] corresponding to the target $T_1$, stored in the target memory 33B and the data corresponding to the reflector $R_1$ on the road transferred from the beam target memory 33A to the target memory 33B are left. In this manner, the target $T_1$ and the reflector $R_1$, on the road are properly discriminated from each other.

In the region indicated by reference character $A_2$ in FIG. 6, the two data points [D198, K1] and [D198, K2] have been stored in the target memory 33B by the wave reflected from the reflector $R_1$ on the road, and the data for the reflector $R_1$ have been also stored in the beam target memory 33A (see FIG. 8). The data for the reflector $R_1$ stored in the beam target memory 33A is included in the two data points [D198, K1] and [D198, K2] stored in the target memory 33B, and hence, the two data points [D198, K1] and [D198, K2] are deleted from the target memory 33B, and in place of them, the data for the reflector $R_1$ stored in the beam target memory 33A are newly stored in the target memory 33B.

As a result, the data in a whitened portion of the region indicated by reference character $A_2$ in FIG. 9 is deleted, and only the data corresponding to the reflector $R_1$ on the road transferred from the beam target memory 33A to the target memory 33B remains. In this manner, the lateral width of the reflector $R_1$, on the road is detected precisely.

In the region indicated by reference character $A_3$ in FIG. 6, the six data points [D197, K7]–[D197, K13] excluding [D197, K10] have been stored in the target memory 33B by the reflected waves from the two targets $T_2$ and $T_3$ and the reflectors $R_2$, and the data for the four reflectors $R_1$, has been also stored in the beam target memory 33A (see FIG. 8). These six data points include any of the data for the four reflectors $R_2$ stored in the beam target memory 33A and hence, the six data points are deleted from the target memory 33B, and in place of them, the data for the four reflectors $R_2$ stored in the beam target memory 33A are newly stored in the target memory 33B.

As a result, the data in the whitened portion of the region indicated by reference character $A_3$ in FIG. 9 is deleted, and only the data corresponding to the four reflectors $R_2$ transferred from the beam target memory 33A to the target memory 33B remains. In this manner, the two targets $T_2$ and $T_3$ are discriminated precisely from each other.

Figure 10:
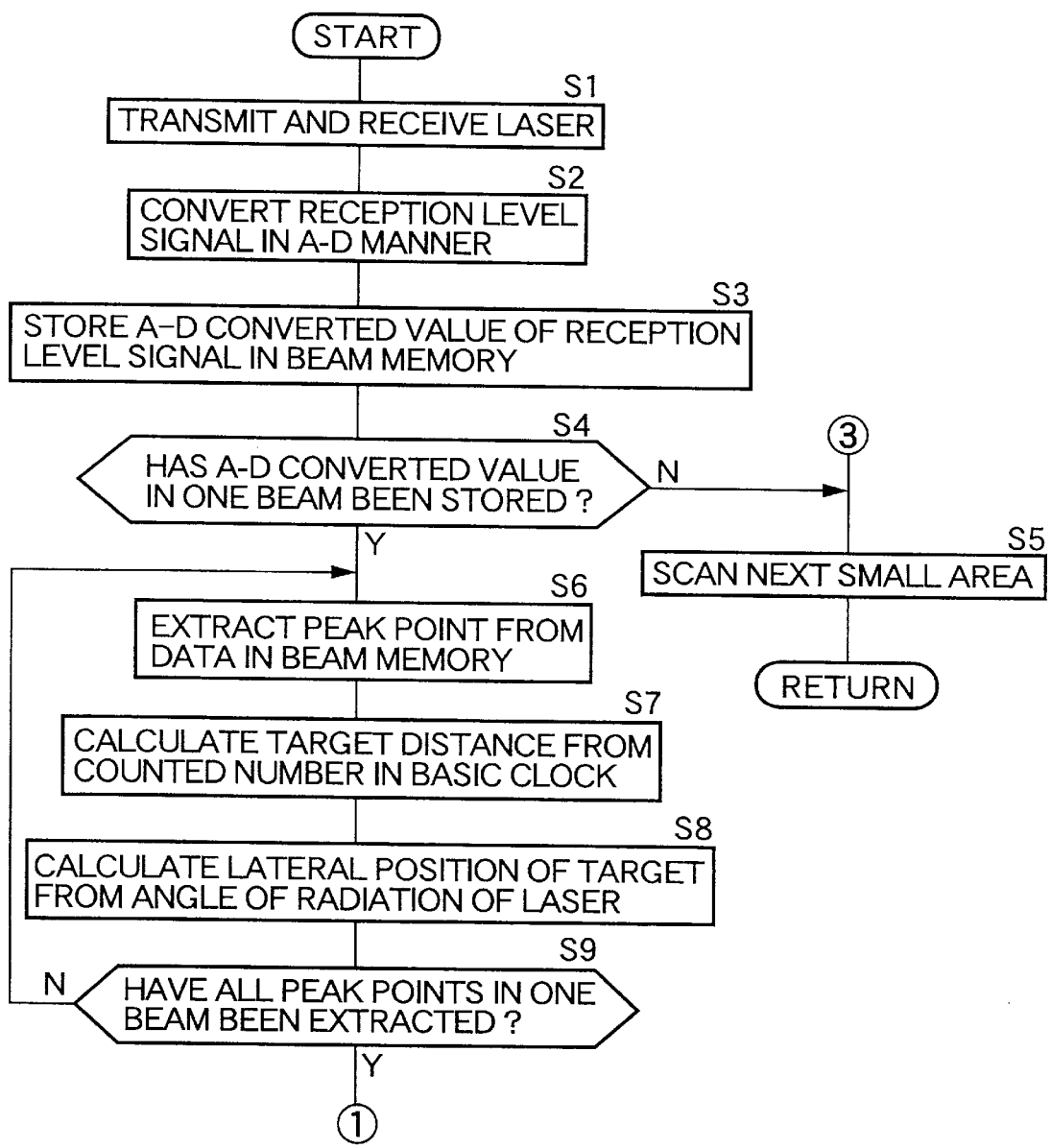
Figure 11:
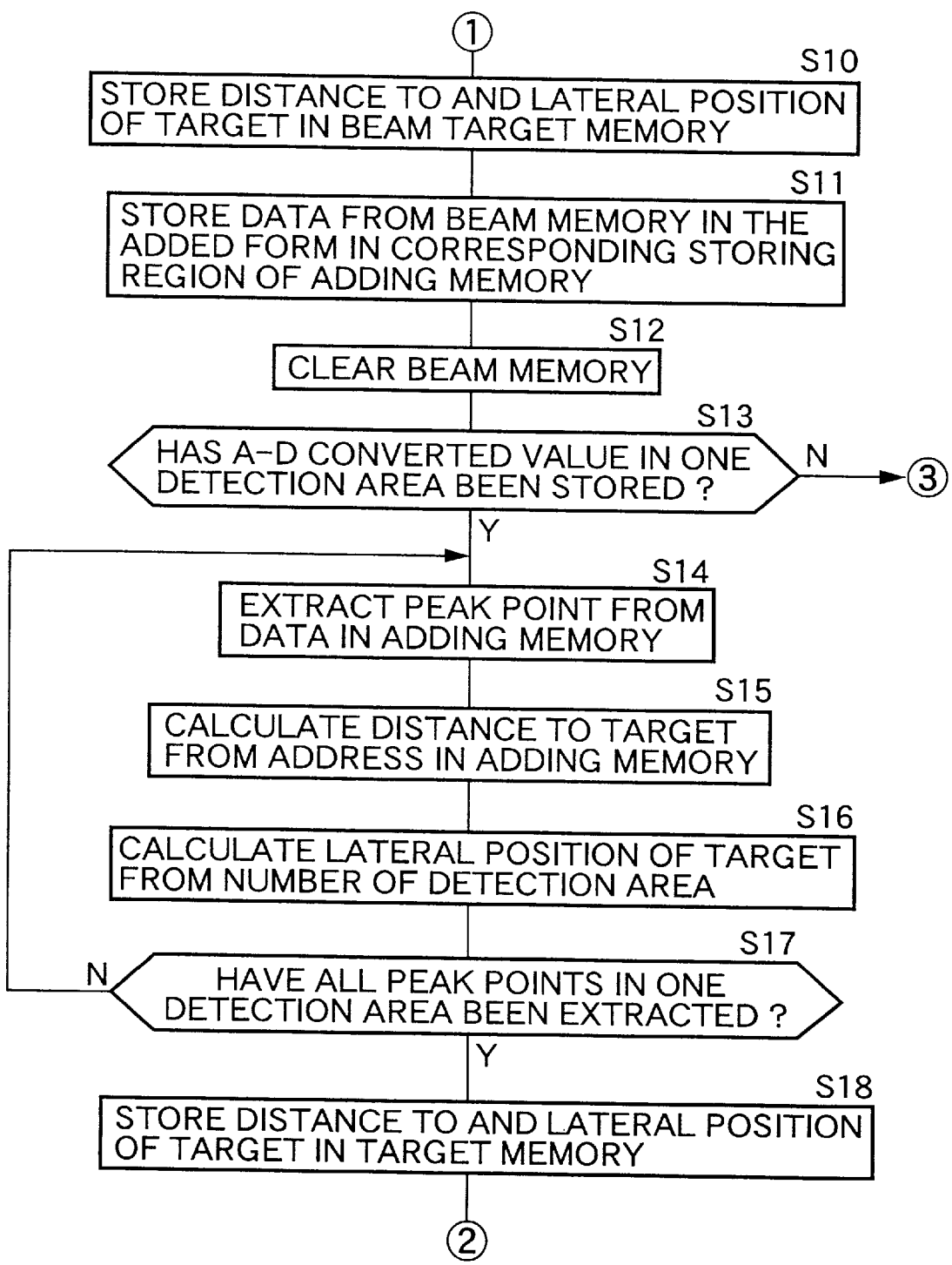
Figure 12:
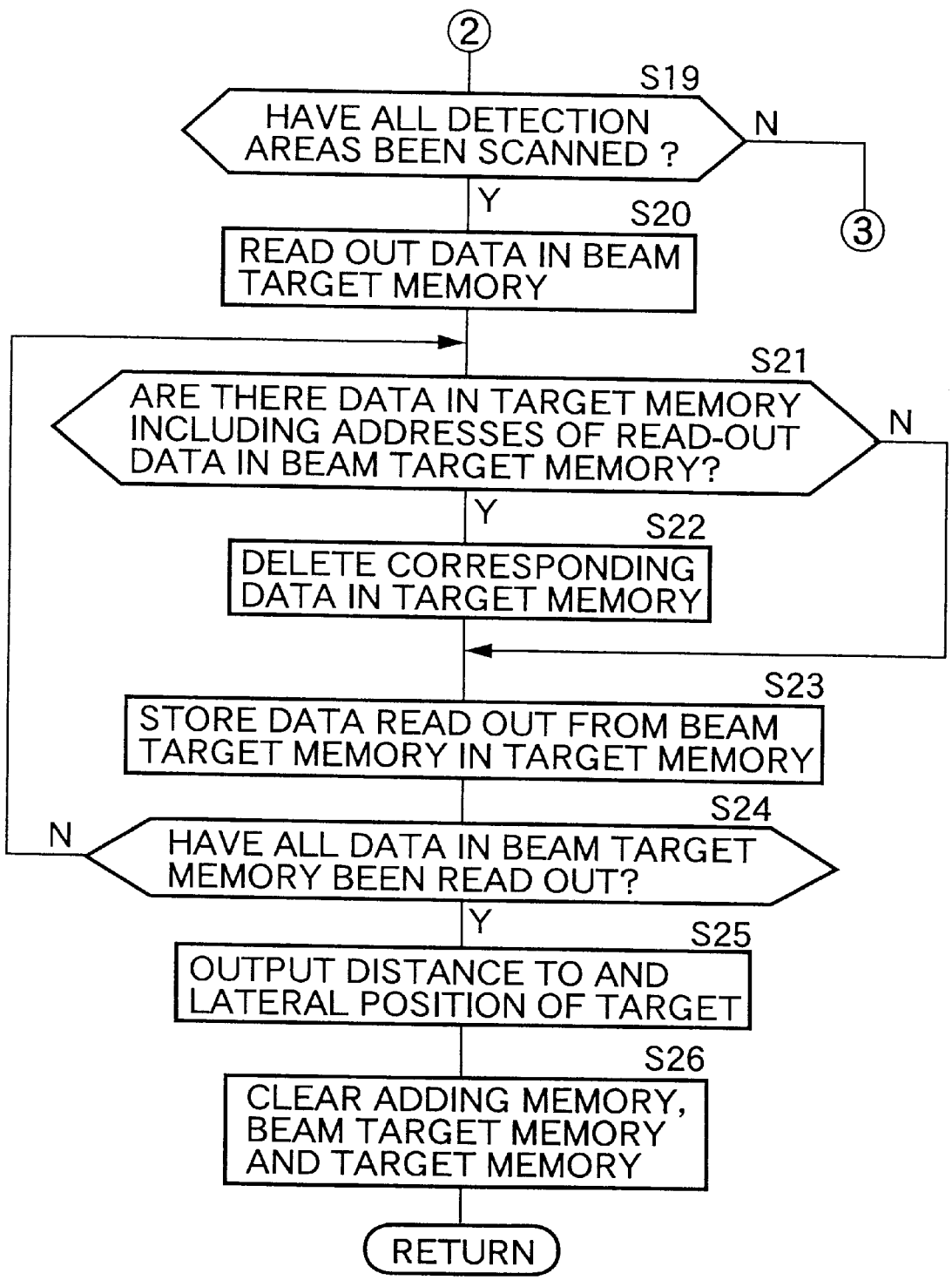

The above-described operation will be further described with reference to a flow chart shown in FIGS. 10 to 12.

First, at Step S1, the transmission of a laser beam to one small area and the reception of a reflected wave are carried out. At Step S2, a signal indicative of reception level of the reflected wave received is A-D converted by an A-D converter 29 for every pulse signal output by the basic clock circuit 31. At Step S3, the data provided by the A-D conversion is stored in a predetermined storing region in the beam memory 32A. For example, the data in [D5] stored in the beam memory 32A, is a value resulting from the A-D conversion of the signal indicative of reception level of the wave reflected from a target existing at a location spaced at a distance of 2.5 m from the vehicle V, and the data stored in [D200] is a value resulting from the A-D conversion of the signal indicative of reception level of the wave 25 reflected from a target existing at a location spaced at a distance of 100.0 m from the vehicle V.

When data corresponding to one beam is stored in the beam memory 32A at Step S4, one of the data points stored in the beam memory 32A which exceeds a preset threshold value is extracted as a peak point at Step S6. A distance to the target is calculated from the counted number of the basic clock pulses, based on the data corresponding to the peak point at Step S7, and a lateral position of the target is calculated from the direction of radiation of the laser beam, based on the data corresponding to the peak point at Step S8. When the extraction of all peak points in the one beam is completed at Step S9, distances to and lateral positions of the target corresponding to the extracted peak points are stored in data regions [BT0], [BT1], [BT2] in the storing regions of the beam target memory 33A at Step S10. The data stored in the beam memory 32A is distributed by the adding area selector 34 and added together and stored in the corresponding storing regions of the adding memory 32B at Step S11, and then, the data in the beam memory 32A is cleared at Step S12.

The above-described operation is carried out sequentially for ten beams included in the first detection area K1 (see Step S13). When all of the data in the first detection area K1 is stored in the adding memory 32B at Step S13, the process is advanced to Step S14. At Step S14, data exceeding the preset threshold value is extracted as a peak point from the data stored in the adding memory 32B. At Step S15, a distance to the target is calculated from the address in the adding memory 32B in which the data of the peak point has been stored, and at Step S16, the lateral position of the target is calculated from the number of the detection area. At next Step S17, the processes at Steps S14 to S16 are repeated until the completion of extraction of all the peak points of the data in the first detection area K1, and at Step S18, the distances to and the lateral positions of the target corresponding to the extracted peak points are stored as data [T0], [T1], [T2] in the storing regions of the target memory 33B.

When the above processes are completed for all the first to fifteenth detection areas K1 to K15 at subsequent Step S19, the process is advanced to Step S20. After the data (see FIG. 8) of the peak points stored in the beam target memory 33A is read out at Step S20, it is determined at Step S21 whether the data including the addresses for the data read out from the beam target memory 33A has been stored in the target memory 33B. If there is the corresponding data stored in the target memory 33B, the corresponding data is deleted from the target memory 33B at Step S22. The data of the peak points read out of the beam target memory 33A is newly stored in the target memory 33B at Step S23.

When all the data in the beam target memory 33A is read out at Step S24, the data (see FIG. 9) for the distances to and the lateral positions of the target stored in the target memory 33B is output to, for example, a cruise control device or an automatic brake device at next Step S25 and then, the adding memory 32B, the beam target memory 33A and the target memory 33B are cleared at Step S26.

Even when a plurality of targets may be detected in an integrally merged manner upon the detection of the targets by adding together the signals indicative of reception levels of the reflected waves because of the presence of highly reflective objects such as the reflectors $R_1$ and $R_2$, the targets can be detected precisely, while being prevented from being integrally merged, by carrying out the detection of the targets without addition of the signals indicative of reception levels of the waves reflected from such highly reflective objects.

When there is no highly reflective object, the target is detected by comparing a value resulting from the addition of the signals indicative of reception levels in the individual smaller areas with the threshold value. Therefore, even when the target has no reflector or has been stained, the generation of a detection failure can be avoided. Moreover, even if the laser beam is diffused radiantly from the vehicle V, since the lateral width of each of the detection areas K1 to K15 is always set to be a constant value (1.6 m) irrespective of the distance from the vehicle V, the signals indicative of reception levels of the waves reflected from substantially the entire surface of the target can be added together without being influenced by the magnitude of the distance to the target, thereby enabling the detection of the target, leading to a remarkably enhanced detecting ability. In addition, since the plurality of detection areas K1 to K15 having the lateral width of 1.6 m which is substantially equal to the lateral width of the vehicle V, are disposed in the manner that they are overlapped one on the other by 0.8 m, the entire target can be reliably detected necessarily in a cover-up manner in any of the detection areas K1 to K15, irrespective of the lateral position of the target.

A second embodiment of the present invention will now be described.

In the above-described first embodiment, it is determined whether the data including the addresses of the data read out from the beam target memory 33A has been stored in the target memory 33B. If the corresponding data has been stored, the data is deleted from the target memory 33B, and the data of the peak point read out from the beam target memory 33A is newly stored in the target memory 33B. The distance to and the lateral position of the target stored in the target memory 33B are used as the data for the target. However, in place of this technique, a technique according to the second embodiment which will be described below can be employed.

First, as in the first embodiment, a peak point is extracted from the data in the beam memory 32A, and a distance to a target is calculated from the counted number of pulses from the basic clock, based on the data of the peak point. Further, a lateral position of the target is calculated from the direction of radiation of a laser beam, based on the data of the peak point. When the extraction of all the peak points is completed for one beam, distances to and lateral positions of the target corresponding to the peak points are stored in data regions [BT0], [BT1], [BT2] in the storing regions of the beam target memory 33A. The course to this point is similar to that in the first embodiment (see Steps S1 to S10).

Then, the data of the peak points corresponding to the data stored in the beam target memory 33A are deleted from the beam memory 32A, and the remaining data is distributed by the adding area selector 34 and added and stored in the corresponding storing regions of the adding memory 32B. Thereafter, the data in the beam memory 32A is cleared. The above operation is carried out sequentially for all the beams included in one detection area. At a time point when all the data in such detection area is stored in the adding memory 32B, data exceeding a preset threshold value is extracted as a peak point from the data stored in the adding memory 32B. For example, the region indicated by reference character $A_1$ in FIG. 6 will be considered below. Data corresponding to the highly reflective reflector $R_1$ mounted on the road has been deleted from the beam memory 32A after being stored in the beam target memory 33A. Therefore, the data of the peak point extracted from the adding memory 32B is only the data corresponding to the target $T_1$.

Subsequently, a distance to the target is calculated from the address in the adding memory 32B where the data of the peak point has been stored, and a lateral position of the target is calculated based on the number of the detection area (this corresponds to Steps S11 to S16). At a time point when the extraction of all the peak points in one detection area is completed, distances to and lateral positions of the target corresponding to the extracted peak points are stored as data [T0], [T1], [T2] in the storing regions of the target memory 33B (this corresponds to Steps S17 and S18). The above operations are repeated sequentially to scan all the detection areas (this corresponds to Step S19).

Then, the distances to and the lateral positions of the target stored in the beam target memory 33A and the distances to and the lateral positions of the target stored in the target memory 33B are output to a vehicle control device, for example, to a cruise control device or an automatic brake device and thereafter, the adding memory 32B, the beam target memory 33A and the target memory 33B are cleared (this corresponds to Steps S25 and S26 and hence, Steps S20 to S24 are not required)

Even according to the second embodiment, a function and effect similar to those in the first embodiment can be provided.

A third embodiment of an object detecting device will now be described with reference to FIGS. 13 to 16.

Figure 13:
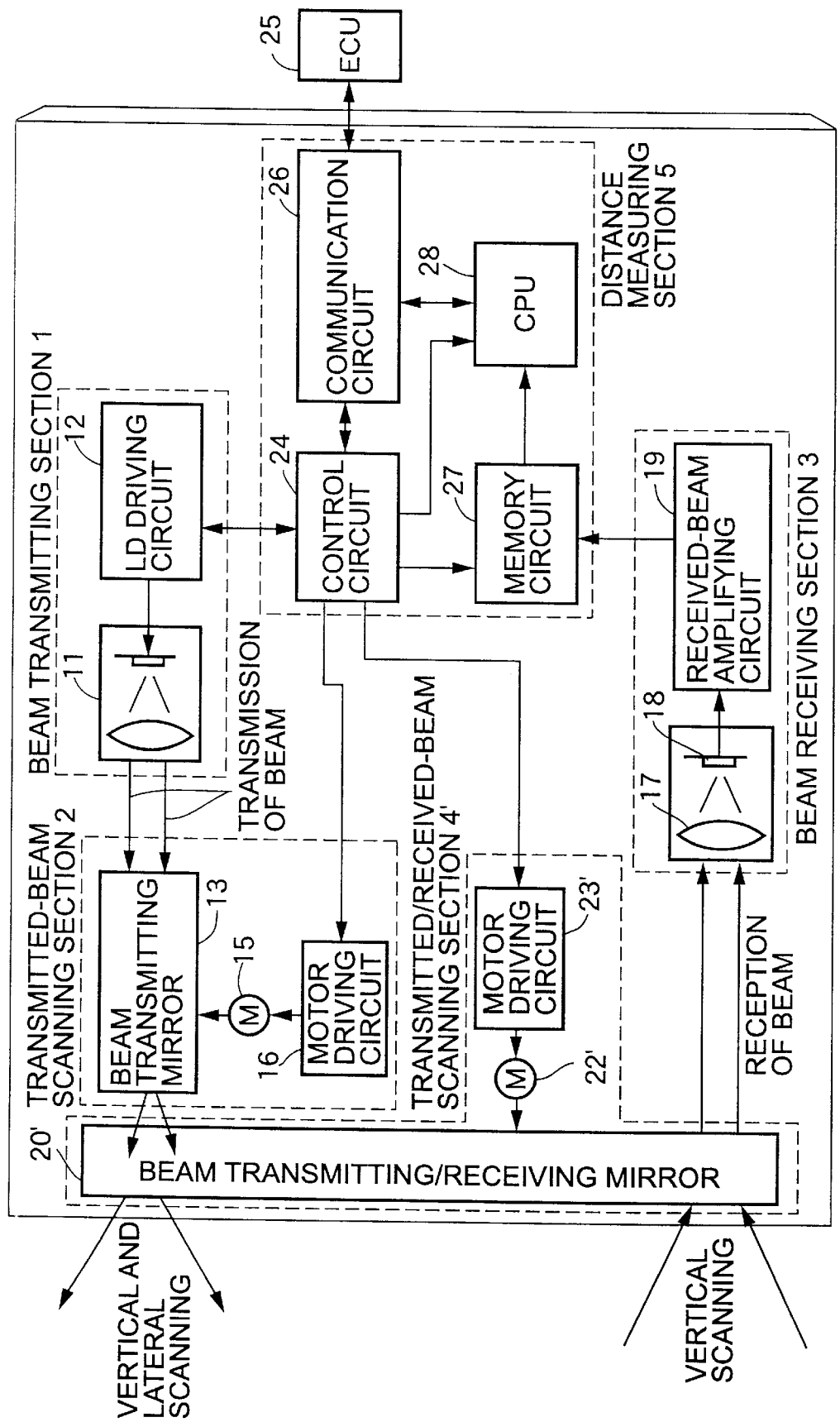
Figure 14:
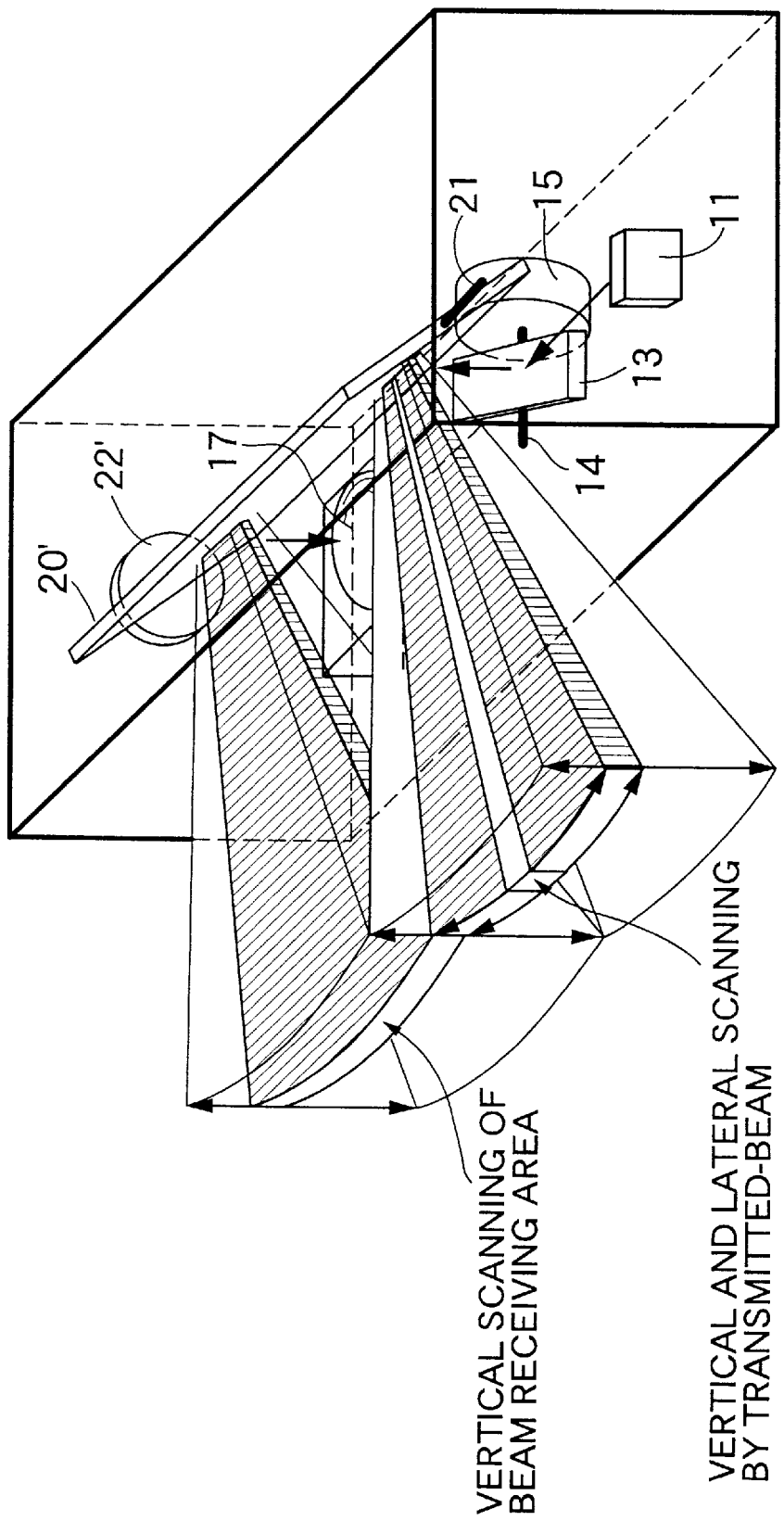

As can be seen by comparison of the first embodiment shown in FIGS. 1 and 2 with the third embodiment shown in FIGS. 13 and 14, the object detecting device of the third embodiment includes a transmitted and received-beam scanning section 4' provided in place of the received-beam scanning section 4 of the object detecting device of the first embodiment. The transmitted and received-beam scanning section 4' includes a beam transmitting and receiving mirror 20', a motor 22' for reciprocally turning the beam transmitting and receiving mirror 20' about a lateral axis 21', and a motor driving circuit 23' for controlling the driving of the motor 22'. A laser beam reflected from the beam transmitting mirror 13 is reflected again from the beam transmitting and receiving mirror 20', and the target T is scanned laterally and vertically by a spot-like laser beam limited in vertical and lateral widths.

Figure 15:
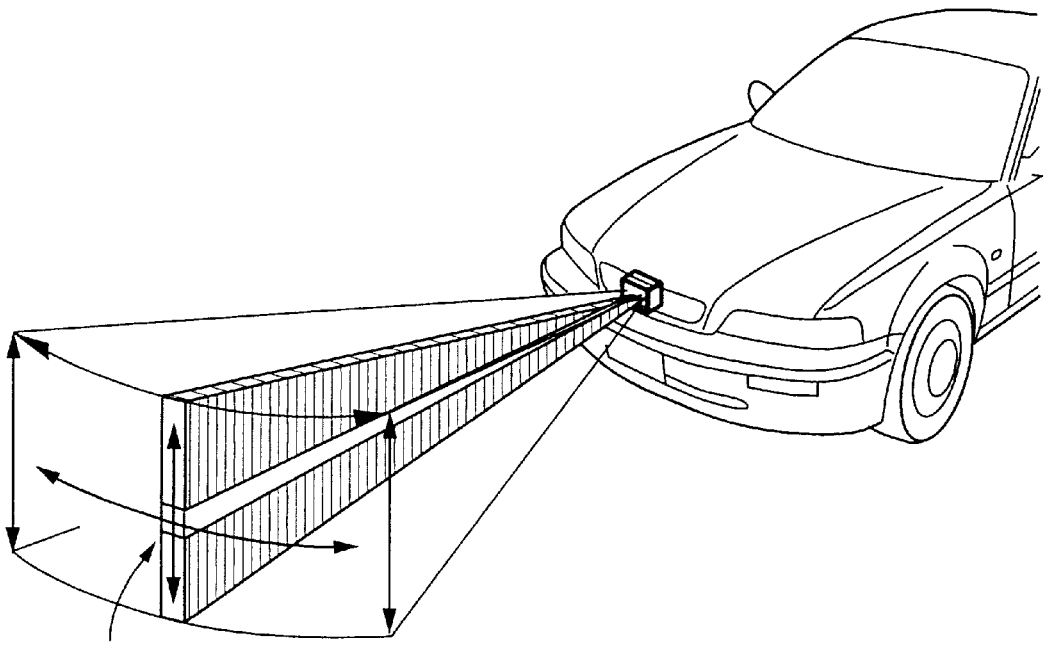
Figure 16:
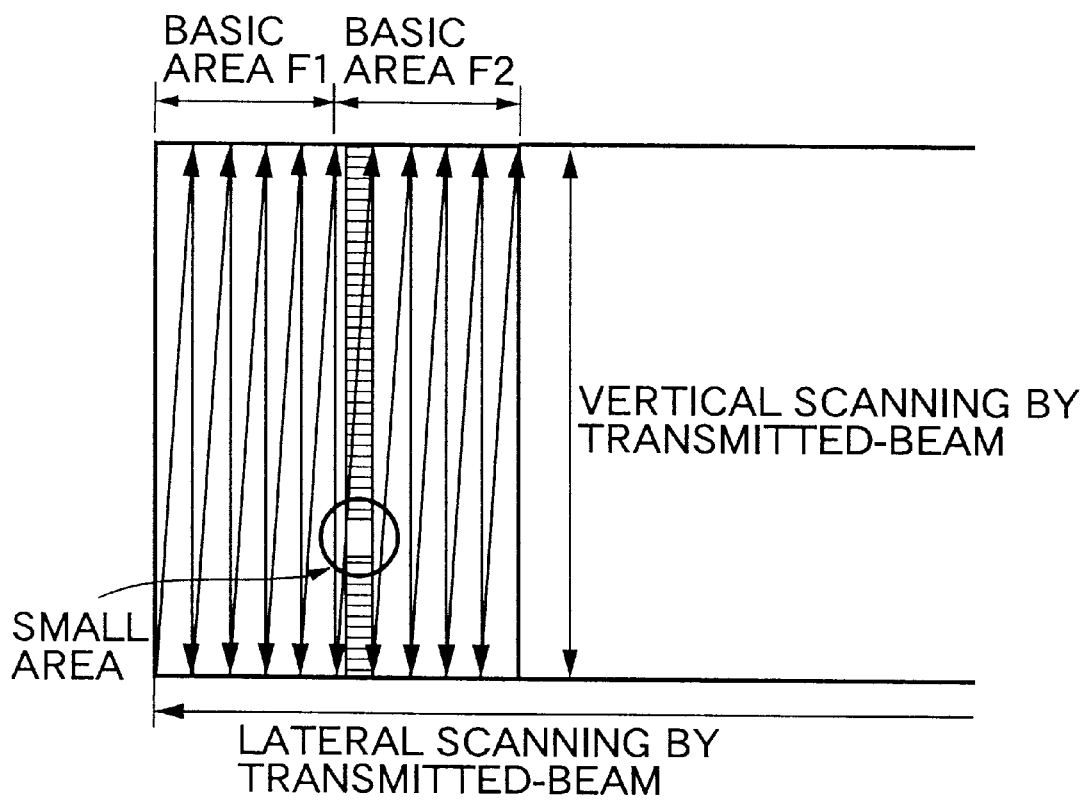

As shown in FIGS. 15 and 16, the period of lateral scanning of the laser beam by the reciprocal turning movement of the beam transmitting mirror 13 is 200 msec, and the period of vertical scanning of the laser beam by the reciprocal turning movement of the beam transmitting and receiving mirror 20' is 2.5 msec. By vertically scanning the beam receiving area by the reciprocal turning movement of the beam transmitting and receiving mirror 20', the period of vertical scanning of the beam receiving area is also 2.5 msec, which is the same as the period of vertical scanning of the laser beam.

As in the first embodiment, the overall area for detecting the target comprises a group of a total of 400 small areas provided by vertically dividing the overall area into 5 sections and laterally dividing the entire area into 80 sections. The 400 small areas are scanned in a zigzag manner for 200 msec. Even according to the third embodiment, a function and effect similar to those in the first embodiment can be achieved.

The object detecting device according to each of the embodiments uses the laser, but other electromagnetic waves such as a millimeter wave can be used in place of the laser. In addition, the number of the small areas forming the entire area for detecting the target is not limited to the 400 in the disclosed embodiments.

Although the embodiments of the present invention have been described in detail, it will be understood that the present invention is not limited to the above-described embodiments, and various modifications in design may be made without departing from the spirit and scope of the invention defined in claims.

What is claimed is:

1. An object detecting device for detecting an object in an object detecting area by transmitting an electromagnetic wave and receiving a reflected wave resulting from the reflection of said electromagnetic wave by the object, comprising a transmitting and receiving means for transmitting the electromagnetic wave and receiving the reflected wave in each of a plurality of small areas into which the object detecting area has been divided, a first storing means for storing signals indicative of reception levels of the reflected waves from the small areas in accordance with the time lag from the transmission to the reception of the waves, a second storing means for storing signals indicative of reception levels of reflected waves in a plurality of detection areas in the form of the received signals added together in accordance with the time lag from the transmission to the reception of the waves, said detection areas being defined by grouping adjacent ones of said plurality of small areas so as to have a predetermined lateral width, and an object detecting means for detecting a distance to the object, based on the result of comparison of an output from said first storing means with an output from said second storing means.

2. An object detecting device according to claim 1, wherein said second storing means detects a lateral position of the object based on a lateral position of the detection area where the object has been detected.

3. An object detecting device according to claim 1 or 2, wherein said plurality of detection areas are defined in an overlapped pattern, one on another by one-half of the lateral width thereof.

4. An object detecting device according to claim 1 or 2, wherein said second storing means extracts and outputs at least one of the values exceeding a threshold value, resulting from the addition of a plurality of signals indicative of reception levels in accordance with the time lag from the transmission to the reception of the electromagnetic wave.

5. An object detecting device according to claim 1 or 2, wherein said transmitting and receiving means transmits the electromagnetic wave sequentially laterally, and said first storing means detects the lateral position of the object based on the timing of transmitting the electromagnetic wave to each of said small areas.

6. An object detecting device according to claim 1 or 2, wherein said object detecting device is mounted on a vehicle to detect the object existing ahead of the vehicle in the direction of movement of the vehicle, and the lateral width of said detection area is set based on the lateral width of the vehicle.

7. An object detecting device according to claim 6, wherein the lateral width of said detection area is set to be substantially equal to the lateral width of the vehicle.

8. An object detecting device according to claim 1 or 2, wherein said object detecting device is mounted on a vehicle to detect the object existing ahead of the vehicle in the direction of movement of the vehicle, and the lateral width of said detection area is set based on the width of a lane of a road.

9. An object detecting device according to claim 6, wherein the lateral width of said detection area is set to be substantially equal to the width of the lane.

10. An object detecting device according to claim 1 or 2, wherein said object detecting means detects the distance to and the lateral position of the object, based on data remaining after deletion of the data for the distances to and the lateral positions of the object based on the data stored in said first storing means from the data for the distances to and the lateral positions of the object based on the data stored in said second storing means, and said data stored in said first storing means.

11. An object detecting device according to claim 1 or 2, further including a third storing means for storing data for distances to and lateral positions of the object based on the data stored in said first storing means, and a fourth storing means for storing data for distances to and lateral positions of the object based on the data stored in said second storing means, and wherein said object detecting means detects the distance to and the lateral position of the object, based on data remaining after deletion of the data for the distances to and the lateral positions of the object stored in said third storing means from the data for the distances to and the lateral positions of the object stored in said fourth storing means, and said data stored in said third storing means.

12. An object detecting device according to claim 1 or 2, including a third storing means for storing data for distances to and lateral positions of the object based on the data stored in said first storing means, and a fourth storing means for storing data for distances to and lateral positions of the object based on the data stored in said second storing means, said second storing means storing data remaining after deleting data corresponding to the data stored in said third storing means from the data stored in said first storing means, and wherein said object detecting means detects distances to and lateral positions of the object based on the data for the distances to and the lateral positions of the object stored in said fourth storing means and said data stored in said third storing means.

* * * * *